Sept. 18, 1928.
H. L. CAMPBELL
1,684,534
ADVERTISING DEVICE
Filed June 4, 1925 2 Sheets-Sheet 1
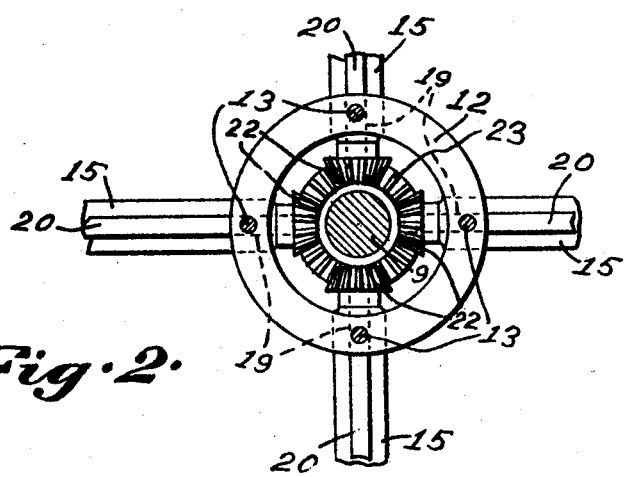
Inventor:
Horace L. Campbell,
By Hugh N. Wagner,
Attorney.

Sept. 18, 1928.  H. L. CAMPBELL  1,684,534
ADVERTISING DEVICE
Filed June 4, 1925   2 Sheets-Sheet 2
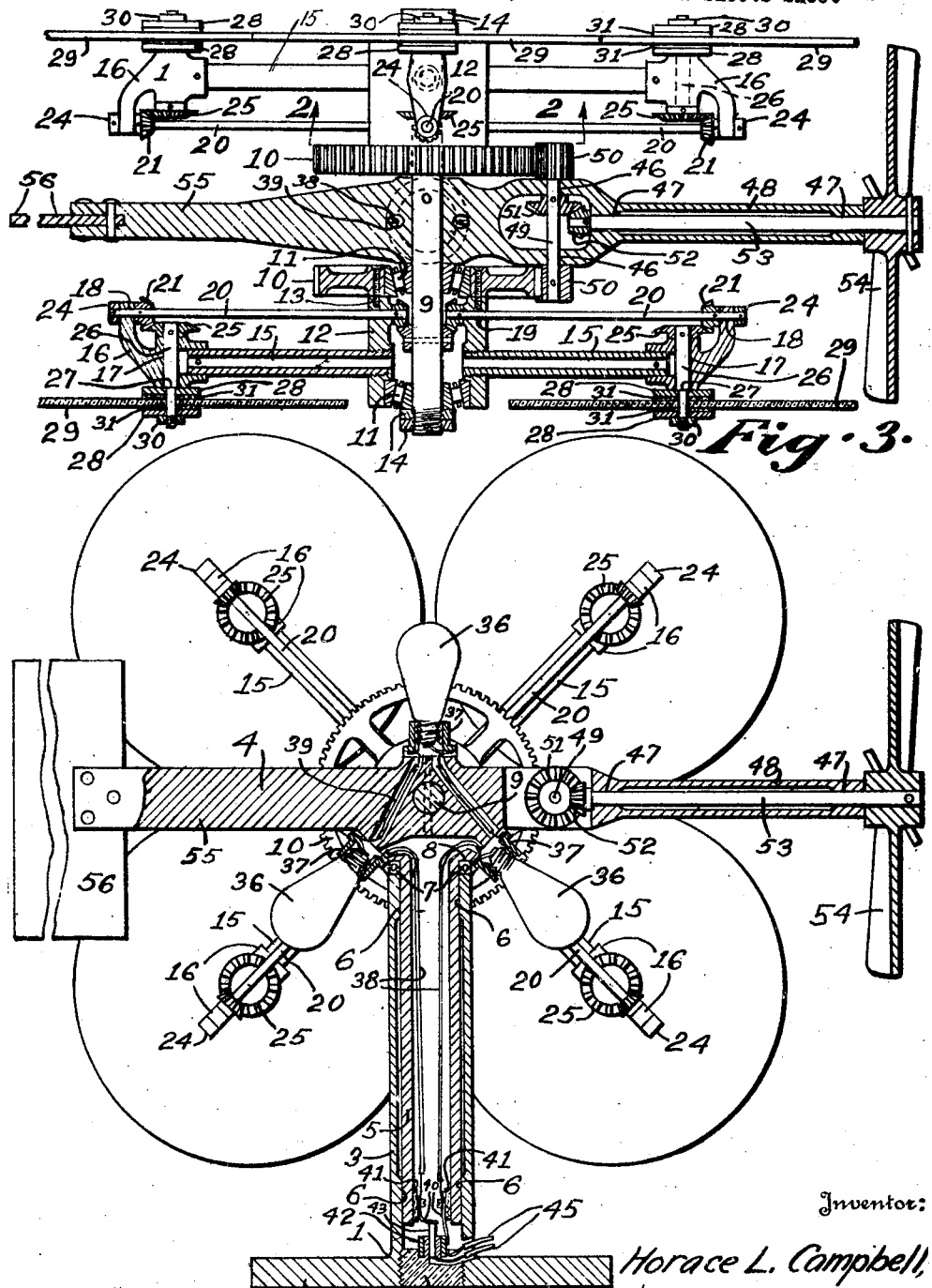
Inventor:
Horace L. Campbell,
By Hugh K. Wagner,
Attorney.

Patented Sept. 18, 1928.

1,684,534

UNITED STATES PATENT OFFICE.

HORACE L. CAMPBELL, OF ST. LOUIS, MISSOURI.

ADVERTISING DEVICE.

Application filed June 4, 1925. Serial No. 34,772.

This invention relates to revolving display devices; and the principal object is to provide means for revolving a plurality of displaying members around a common center without rotating them with relation to one another.

Another object is to provide a device such as described which may be driven by wind power, and which will automatically shift its plane of revolution.

A further object is the provision of means for producing novel illuminative effects simultaneously with the rotation of the device.

Other objects and advantages will appear in the course of the following description of the preferred form of this invention.

In the accompanying drawings forming part of this specification, in which like numbers of reference denote like parts wherever they occur, Figure 1 is an elevation of the complete device;

Figure 2 is a fragmentary sectional view taken on the line 2—2 in Figure 3;

Figure 3 is a plan view of the device as it appears when the displaying-member supporting-arms are in the horizontal and vertical positions, respectively, parts being shown in section in a horizontal section taken through the main axis of the device; and Figure 4 is a vertical longitudinal central sectional view exhibiting the device when its displaying-member supporting-arms are inclined at an angle of forty-five degrees to the horizontal.

The support or casting 1, consisting of a base piece 2 and a tube or hollow column 3, projecting upwardly therefrom, pivotally supports the casting or supporting member 4, which has integral therewith a depending hollow shaft 5, journaled in bearings 6 at the upper and lower ends in the tube 3. The weight of the block 4 and the parts carried thereby is borne on a ball-bearing 7 interposed between the upper end of the tube 3 and a shoulder 8 formed integral with the hollow shaft 5. A horizontal stationary shaft 9 is secured in a bore in the block 4 directly above the hollow vertical shaft 5, and extends equal distances from each side of the block.

Adjacent each side of the block 4 are supr gears 10 journaled preferably on roller bearings 11 on the stationary shaft 9. Housings 12 are secured to the outer sides of the hubs of the gears 10 preferably by means of screws 13. The outer ends of the housings 12 are supported on the shaft 9 preferably by means of roller bearings 11, the nuts 14 on the outer threaded ends of the shaft securing the gears, roller bearings and housings in position on the shaft. A plurality of radially extending arms 15, in the present instance four, preferably tubular in form, are screw-threaded into the walls of each of the housings 12, forming therewith a pair of oppositely facing rotary frames. Castings 16 are secured to the outer ends of the arms 15, and contain bearings 17 and 18 disposed parallel and perpendicular, respectively, to the shaft 9. The bearings 18 are alined with similar bearings 19 extending through the wall of the housings 12 in juxtaposition to the gears 10. Shafts 20 are journaled in the bearings 18 and 19, and have affixed thereto bevel pinions 21 and 22, abutting the inner end faces of the bearings 18 and 19, respectively. Pinions 22 are in mesh with bevel gears 23, affixed on the stationary shaft 9 in their respective housings 12. Collars 24, affixed to the outer ends of the shafts 20, prevent endwise dislocation of the said shafts. Pinions 21 mesh with bevel gears 25, affixed to the inner ends of spindles 26, journaled in the bearings 17. Pinions 21 and 22 are of the same size and face in the same direction on their respective shafts; and gears 23 and 25 are of the same size and face toward the shafts 20. This relative facing and arrangement of the pinions 21 and 22 and gears 23 and 25 and their respective shafts constitutes a parallel motion mechanism, whereby, when housings 12, arms 15, and their associated parts rotate, any line taken transversely through any of the spindles 26 will always remain parallel to a line taken in the same direction through the stationary shaft 9.

The outer ends of the spindles 26 are reduced in diameter to form shoulders 27, against which abut metal discs 28, which cooperate with similar metal discs 28 on the outer end of the reduced portions to secure glass discs 29 in fixed relation to the spindles 26 when the nuts 30 are screwed against the outer discs 28. Rubber washers 31 are preferably interposed between the glass plates 29 and the metal discs 28 to insure intimate contact and even distribution of pressure on the glass discs. It will be observed that the aforesaid parallel motion mechanism is connected at one end to the supporting member or block 4, since the shaft 9 is secured thereto; and at the other end to the display means or members 29, since the shafts or spindles 26 are connected to the discs or display members 29 by means of the nuts 30. This invention of the parallel motion mechanism between the discs 29 and the supporting member 4 assures that the angular relation between the discs 29 and the block or supporting member 4 will be maintained constant at all times, no matter what the position of the rotating frames may be at any instant. Otherwise stated, the parallel motion mechanism prevents rotation of the discs 29 on their axes with relation to the supporting member 4, but permits such rotation relatively to the rotating frames, which comprise the housing 12, tubes 15, and brackets 16. That this is true may be easily verified by studying the motions of the parts as the frame rotates. Assuming, for example, that the frame is rotating clockwise, so that the left hand discs are ascending while the right hand discs are descending, it will be observed that the shafts 20 must rotate in a direction which may be stated to be clockwise if viewed from the outer ends of the said shafts, by reason of the engagement of inner pinions 22, fixed on shafts 20, with stationary gears 23, fixed on stationary shaft 9. Shafts 20, through pinions 21 and gears 25, rotate spindles 26 in a direction which must be counter clockwise with relation to the already rotating frames, and, if the pinions 21 and 25 bear the same speed relations to one another as do the pinions 22 and 23, it will be evident that the rotation of the frames is compensated for by the counter-rotation of the discs, so that the discs remain relatively stationary on their axes with respect to the block 4. The glass discs 29 are one embodiment of diverse types of display members which may be affixed to the spindles 26. The display members may be of any suitable form to display advertisements or products of manufacture or other commodities to the public. In the present instance, for the purpose of illustration, glass discs are employed to exhibit to advantage various colors that may be used in painting, varnishing, dyeing or coloring. In Figure 1, for example, the discs are divided into four quadrants, one being colored blue 32, another red 33, another white 34, and another, say, yellow 35. The various colored quadrants are so disposed on the various discs that, as the frame revolves, say, in a clockwise direction, all the blues are in the inner quadrants. As the rotation continues, the blues move outward and the yellow quadrants become the inner ones. The whites succeed the yellow, and the red follow the whites as the inner quadrants. With further rotation the foregoing cycle is repeated. The rotation of the device thus produces a conspicuous effect which attracts the attention of the passerby.

This effect may be enhanced by illuminating, say, only the inner quadrants. Since the discs 29 are of glass, the light may be placed on the inner side of the frame and be transmitted through the glass to the observer. The illumination may be produced by electric lamps 36, secured in sockets 37, and supplied with current through wiring 38, passing through conduits 39, formed in the block 4. The wiring 38 terminates in brushes 40, secured to insulating blocks 41, attached to the inner side of the hollow shaft 5. The brushes 40 engage respectively the contact ring 42 and contact plug 43 imbedded in insulating plug 44 in the bottom of hollow column 3. Wiring 45 extends from the ring 42 and plug 43 to a suitable source of electric current. This device may also be employed to project lights of varying colors on objects within its range.

Only one rotary frame may be used; but preferably two are employed, each facing toward the outside of the device. The frames may be driven in any suitable manner and from any available source of power. It is preferred to drive the two frames simultaneously; and, where the device is set up outdoors, windpower may be employed to rotate the frames. To this end, horizontally disposed bearings 46 and 47 are formed in the block 4, the bearings 46 extending transversely of the block at the sides thereof and immediately beyond the gears 10, and the bearings 47 being formed within a tubular extension 48 projecting outwardly from the block beyond the bearings 46 and at right angles thereto. A shaft 49 is journaled in bearings 46, and has affixed thereto spur pinions 50, which mesh with the gears 10. The block 4 is recessed to provide room for intermeshing bevel gears 51 and 52, respectively affixed to the shaft 49 and the inner end of a shaft 53 journaled in the bearings 47. A wind-driven rotary member, such as a propeller 54, is affixed to the outer end of the shaft 53. An arm 55 projects horizontally from the other end of the block 4 and has secured to its outer end a vane 56, which functions to turn the block on its pivotal support 1 to accommodate the propeller 54 to winds which are continually shifting in direction. The display matter may be viewed from opposite sides of the device as the block turns on its pivot.

Having thus fully described this invention, I hereby reserve the benefit of all changes in form, arrangement, order, or use of parts, as it is evident that many minor changes may be made therein without de- parting from the spirit of this invention or the scope of the following claims.

I claim:

1. A device of the character described comprising a supporting member, a frame rotatably connected thereto, a plurality of display members rotatably carried by the frame and grouped around the axis thereof adjacent to each other and having similar character-bearing sections similarly arranged thereon, and a parallel-motion mechanism connecting said supporting member and said display members whereby the vertical and horizontal diameter of each display member remains parallel with the same diameters of the other display members when said frame is rotated.

2. A device of the character described comprising a supporting member, a rotatable frame carried thereby, a plurality of display members comprising similarly colored sections similarly arranged thereon, the said members being rotatably mounted on said frame around the axis thereof adjacent to each other and in parallel axial relation thereto, and a parallel-motion mechanism connecting said supporting member and said display members whereby the vertical and horizontal diameter of each display member remains parallel with the same diameters of the other display members when said frame is rotated, said colored sections being so disposed on said display members that all the sections of the display members which are adjacent to the center of the frame are of the same color, and that during rotation of the frame the similarly colored sections that are adjacent to the center of the frame are replaced by sections that are similarly colored with relation to one another but are colored differently than the sections they have replaced.

In testimony whereof I hereunto affix my signature.

HORACE L. CAMPBELL.